United States Patent
Shibayama et al.

(10) Patent No.: US 9,978,075 B2
(45) Date of Patent: May 22, 2018

(54) POPULATION ESTIMATION APPARATUS, PROGRAM AND POPULATION ESTIMATION METHOD

(71) Applicant: AGOOP Corp., Tokyo (JP)

(72) Inventors: Kazuhisa Shibayama, Tokyo (JP); Takashi Umakoshi, Tokyo (JP); Hirofusa Watamori, Tokyo (JP); Yutaka Yamada, Tokyo (JP)

(73) Assignee: AGOOP Corp., Tokyo (JP)

( * ) Notice: Subject to any disclaimer, the term of this patent is extended or adjusted under 35 U.S.C. 154(b) by 0 days. days.

(21) Appl. No.: 15/494,558

(22) Filed: Apr. 24, 2017

(65) Prior Publication Data

US 2017/0228748 A1    Aug. 10, 2017

Related U.S. Application Data

(63) Continuation of application No. PCT/JP2014/078414, filed on Oct. 24, 2014.

(51) Int. Cl.
*H04M 1/00* (2006.01)
*G06Q 30/02* (2012.01)
(Continued)

(52) U.S. Cl.
CPC .......... *G06Q 30/0205* (2013.01); *H04W 8/08* (2013.01); *G06F 17/30241* (2013.01); *H04M 1/72519* (2013.01); *H04W 64/00* (2013.01)

(58) Field of Classification Search
CPC ....... H04W 64/00; H04W 8/08; H04W 8/245; G06Q 30/0205; G06F 17/30241; H04M 1/72519
(Continued)

(56) References Cited

U.S. PATENT DOCUMENTS

2010/0306249 A1*  12/2010  Hill ................... G06F 17/30867
                                                               707/769
2012/0094686 A1    4/2012  Suzuki et al.
(Continued)

FOREIGN PATENT DOCUMENTS

EP         2000962 A1    12/2008
JP       2005-202546 A     7/2005
(Continued)

OTHER PUBLICATIONS

International Preliminary Report on Patentability for International Application No. PCT/JP2014/078414, issued by the International Bureau of WIPO dated May 4, 2017.
(Continued)

*Primary Examiner* — Danh Le

(57) ABSTRACT

A log information obtaining unit which obtains log information; a population information obtaining unit which obtains local population information indicating a population of a local area; a first terminal extraction unit which extracts, based on the log information, a wireless terminal present in the local area in a particular time from among the one or more wireless terminals; a relation parameter deriving unit which derives a relation parameter representing a relation between the number of wireless terminals and the population based on a population of the local area indicated by the local population information and the number of wireless terminals extracted by the first terminal extraction unit; and an estimated value deriving unit which derives an estimated population value from the number of wireless terminals by using the relation parameter are comprised.

18 Claims, 14 Drawing Sheets

(51) Int. Cl.
   *H04W 8/08*   (2009.01)
   *G06F 17/30*   (2006.01)
   *H04M 1/725*   (2006.01)
   *H04W 64/00*   (2009.01)

(58) Field of Classification Search
   USPC .................. 455/456.1, 550.1, 418, 422.1
   See application file for complete search history.

(56) References Cited

U.S. PATENT DOCUMENTS

| | | | |
|---|---|---|---|
| 2012/0108261 A1* | 5/2012 | Miyake | H04W 4/028 455/456.1 |
| 2012/0115505 A1* | 5/2012 | Miyake | G06Q 10/06 455/456.1 |
| 2012/0209658 A1 | 8/2012 | Shibayama et al. | |
| 2012/0312872 A1* | 12/2012 | Clapsaddle | G06Q 30/0201 235/380 |
| 2013/0090132 A1 | 4/2013 | Terada et al. | |
| 2013/0103946 A1* | 4/2013 | Binenstock | H04L 63/0492 713/168 |
| 2013/0137459 A1 | 5/2013 | Kobayashi et al. | |
| 2014/0095293 A1* | 4/2014 | Abhyanker | H04L 67/18 705/14.41 |
| 2015/0201067 A1* | 7/2015 | Chen | H04M 3/2218 379/45 |
| 2016/0055503 A1* | 2/2016 | Chan | G06Q 30/0205 705/7.34 |
| 2016/0110984 A1* | 4/2016 | Seol | H04W 4/008 340/539.13 |
| 2016/0260022 A1 | 9/2016 | Yamada et al. | |
| 2016/0261991 A1 | 9/2016 | Yamada et al. | |
| 2017/0017996 A1* | 1/2017 | Watfa | G06Q 30/02 |

FOREIGN PATENT DOCUMENTS

| | | |
|---|---|---|
| JP | 2010-200283 A | 9/2010 |
| JP | 2013-097471 A | 5/2013 |
| WO | 2009-107618 A1 | 9/2009 |
| WO | 2010-113706 A1 | 10/2010 |
| WO | 2011-021606 A1 | 2/2011 |

OTHER PUBLICATIONS

International Search Report for International Patent Application No. PCT/JP2014/078414, issued by the Japan Patent Office dated Jan. 27, 2015.

Office Action issued for counterpart Japanese Application 2015-562232, issued by the Japan Patent Office dated Dec. 20, 2016.

Extended European Search Report for European Patent Application No. 14 904 464.6, issued by the European Patent Office dated Jul. 6, 2017.

* cited by examiner

800

| TERMINAL ID OF TERMINAL PRESENT IN X CITY ON SEPTEMBER 1, 2014, 3:00 P.M. | AREA ID OF LOCAL AREA IN WHICH EACH TERMINAL WAS PRESENT ON SEPTEMBER 1, 2014, 3:00 A.M. |
|---|---|
| T1001 | A0001 |
| T1004 | A0001 |
| T1007 | A0002 |
| T1010 | A0005 |
| : | : |

| AREA ID OF LOCAL AREA IN WHICH EACH TERMINAL WAS PRESENT ON SEPTEMBER 1, 2014, 3:00 A.M. | NUMBER OF TERMINAL IDs IN EACH LOCAL AREA |
|---|---|
| A0001 | 100 |
| A0002 | 200 |
| A0005 | 500 |
| A0008 | 800 |
| : | : |

| TERMINAL ID | POSITION OF TERMINAL | CLOCK TIME OF OBTAINING |
|---|---|---|
| T0001 | * * * | 2012/12/10 ⋯ |
| T0001 | * * * | 2012/12/10 ⋯ |
| ⋮ | ⋮ | ⋮ |
| T0002 | * * * | 2012/12/11 ⋯ |
| T0002 | * * * | 2012/12/11 ⋯ |
| ⋮ | ⋮ | ⋮ |
| T0003 | * * * | 2012/12/12 ⋯ |
| T0003 | * * * | 2012/12/12 ⋯ |
| ⋮ | ⋮ | ⋮ |

| TERMINAL ID FOR WHOLE PERIODS (1212) | VALID TIME PERIOD (1214) | TERMINAL ID IN THE TIME PERIOD (1216) |
|---|---|---|
| 0001 | 2014/9/1 | T0001 |
| 0002 | 2014/9/1 | T0002 |
| ⋮ | ⋮ | ⋮ |
| *** | 2014/9/1 | *** |
| *** | 2014/9/2 | T0001 |
| ⋮ | ⋮ | ⋮ |
| *** | 2014/9/2 | *** |
| ⋮ | ⋮ | ⋮ |

| PARAMETER ID | AREA ID OF APPLIED AREA | APPLIED TIME SEGMENT | PARAMETER BEFORE CORRECTION | PARAMETER AFTER CORRECTION |
|---|---|---|---|---|
| P0001 | A0001 | 06:01-9:00 | * * * | * * * |
| P0002 | A0001 | 09:01-15:00 | * * * | * * * |
| P0003 | A0001 | 15:01-21:00 | * * * | * * * |
| P0004 | A0001 | 21:01-06:00 | * * * | * * * |
| P0005 | A0002 | 06:01-9:00 | * * * | * * * |
| P0006 | A0002 | 09:01-15:00 | * * * | * * * |
| P0007 | A0002 | 15:01-21:00 | * * * | * * * |
| P0008 | A0002 | 21:01-06:00 | * * * | * * * |
| : | : | : | : | : |

| AREA ID | GEOGRAPHIC RANGE OF THE AREA |
|---|---|
| A0001 | ENTIRE AREA OF JAPAN |
| A0002 | ENTIRE AREA OF TOKYO |
| A0003 | PARTICULAR AREA 1 OF TOKYO |
| A0004 | PARTICULAR AREA 2 OF TOKYO |
| ⋮ | ⋮ |
| A**** | ENTIRE AREA OF OSAKA |
| ⋮ | ⋮ |
| A**** | ENTIRE AREA OF KYOTO |
| ⋮ | ⋮ |

1412 — AREA ID column
1414 — GEOGRAPHIC RANGE OF THE AREA column

*FIG. 14*

POPULATION ESTIMATION APPARATUS, PROGRAM AND POPULATION ESTIMATION METHOD

The contents of the following PCT patent application are incorporated herein by reference:
NO. PCT/JP2014/078414 filed on Oct. 24, 2014.

BACKGROUND

1. Technical Field

The present invention relates to a population estimation apparatus, a program and a population estimation method.

2. Related Art

It is known to estimate a fluctuating population based on a survey result value for each type of facilities (refer to Patent Document 1). Also, it is known to identify a fluctuating population by using a communication terminal (refer to Patent Documents 2 to 7).

PRIOR ART DOCUMENT

[Patent Document 1] WO 2011/024379
[Patent Document 2] Japanese Patent Application Publication No. 2013-97471
[Patent Document 3] Japanese Patent Application Publication No. 2005-202546
[Patent Document 4] Japanese Patent Application Publication No. 2010-200283
[Patent Document 5] WO 2010/113706
[Patent Document 6] WO 2010/116916
[Patent Document 7] WO 2011/021606

However, it is not known a method of estimating a population or a population change in a particular area with a high accuracy based on the number of communication terminals present in the area.

BRIEF DESCRIPTION OF THE DRAWINGS

FIG. 8 schematically illustrates one example of a processing result in an area determination unit 714.

FIG. 9 schematically illustrates one example of a processing result in a terminal count deriving unit 716.

FIG. 11 schematically illustrates one example of a data table 1100.

FIG. 12 schematically illustrates one example of a data table 1200.

FIG. 13 schematically illustrates one example of a data table 1300.

FIG. 14 schematically illustrates one example of a data table 1400.

DESCRIPTION OF EXEMPLARY EMBODIMENTS

Figure 1:
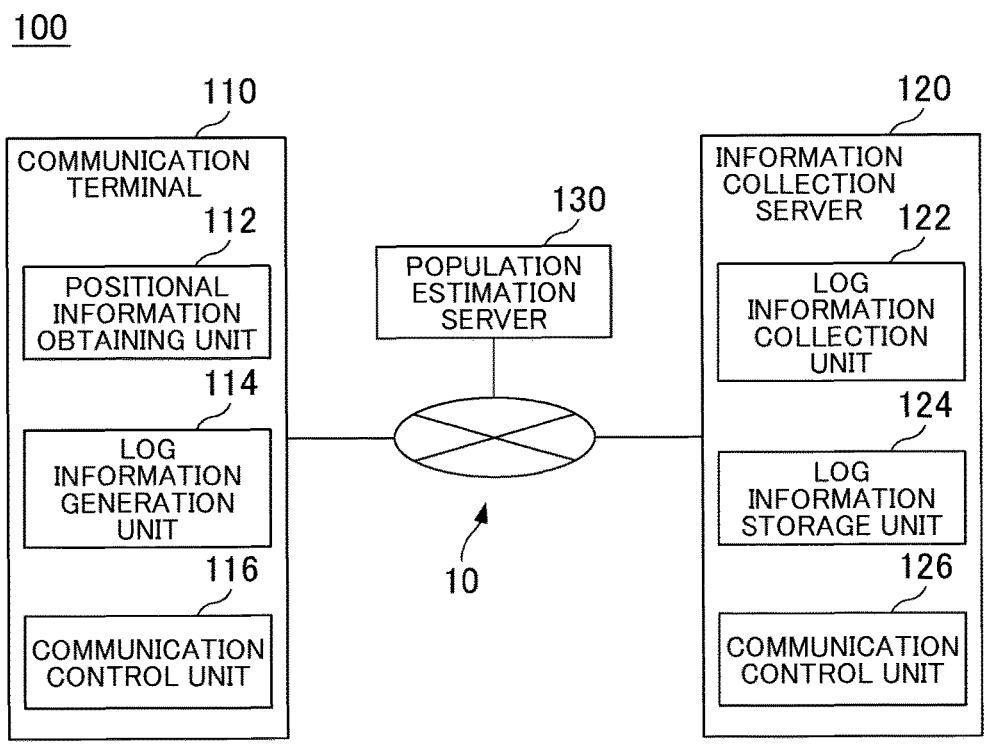
FIG. 1 schematically illustrates one example of a population estimation system 100.

Hereinafter, one aspect of the present invention is described through the embodiments of the invention. However, the following embodiments are not to limit the claimed inventions. Also, all of combinations of features described in the embodiments are not necessarily required for a means for solving problems of the invention. Note that in the drawings, the same reference numerals may be applied to the same or similar portions and the redundant descriptions may be omitted.

FIG. 1 schematically illustrates one example of a population estimation system 100. The population estimation system 100 estimates a population or a population movement in an arbitrary area. In the present embodiment, the population estimation system 100 estimates a population or a population movement by using positional information of one or more communication terminals 110. The arbitrary area just needs to be a division having a predetermined geographic range and may be illustrated as, for example, an administrative division (which may be referred to as an administrative segment, an administrative district and the like), a division subject to a national census, a division which is an area subdivided by an unit region having a predetermined size and shape (which may be referred to as an area mesh and the like).

In the present embodiment, the population estimation system 100 includes a communication terminal 110, an information collection server 120, and a population estimation server 130. The communication terminal 110 includes a positional information obtaining unit 112, a log information generation unit 114, and a communication control unit 116. Also, the information collection server 120 includes a log information collection unit 122, a log information storage unit 124, and a communication control unit 126. Each of the population estimation system 100 and the population estimation server 130 may be one example of the population estimation apparatus. The communication terminal 110 may be one example of one or more wireless terminals. Each of the information collection server 120 and the log information collection unit 122 may be one example of the log information obtaining unit.

Each of the communication terminal 110, the information collection server 120 and the population estimation server 130 may transmit and receive information with one another via the communication network 10. The communication network 10 may be a transmission path for wired communication, may be a transmission path for wireless communication, or may be a combination of a transmission path for wireless communication and a transmission path for wired communication. The communication network 10 may be a mobile communication network such as a cellular phone network, a wireless packet communication network, the Internet and a dedicated line, or a combination thereof.

The communication terminal 110 includes a communication function. The communication terminal 110 may include a wireless communication function. The communication terminal 110 may also correspond to a plurality of communication systems. For example, the communication terminal 110 corresponds to both of communication systems of a mobile communication system such as 3G, LTE, and 4G systems, and a wireless communication system such as WiFi (registered trademark) and WiMAX (registered trademark).

The communication terminal 110 just needs to be an apparatus which can transmit and receive information with at least one of the information collection server 120 and the population estimation server 130, and may be, for example, a personal computer, a cellular phone or a smart phone, a mobile terminal (which may be illustrated as a PDA, a tablet, a notebook computer or a laptop computer and the like), a wireless terminal including Web browser software introduced therein.

The communication terminal 110 may be achieved by activating software or a program that defines operations of each unit of the communication terminal 110 in an information processing apparatus having a general configuration. The information processing apparatuses used as the communication terminal 110 may include a data processing apparatus having a processor such as a CPU, an ROM, an RAM, a communication interface and the like; an input apparatus such as a keyboard, a touch panel, or a microphone, a GPS information obtaining apparatus, an acceleration sensor, a gyro sensor; an output apparatus such as a display apparatus, a speaker and a vibration apparatus; and a storage apparatus such as a memory and an HDD. The data processing apparatus or the storage apparatus may store the software or the program described above. The software or the program described above causes, by being executed by a processor, the information processing apparatus described above to execute operations defined by the software or the program.

The positional information obtaining unit 112 obtains positional information indicating a position of the communication terminal 110. The positional information may be information indicating latitude and longitude, and may further include information indicating altitude. The positional information may be information indicating an address. The positional information obtaining unit 112 may obtain the positional information of the communication terminal 110 based on a GPS signal received from a GPS satellite. Based on electric field intensities of radio waves and the like received from one or more base stations or access points of the communication network 10, the positional information of the communication terminal 110 may be obtained. Based on electric field intensities of radio waves and the like from the communication terminal 110 at one or more base stations or access points of the communication network 10, the positional information of the communication terminal 110 may be obtained.

The positional information obtaining unit 112 may also obtain information about accuracy of the positional information (which may be referred to as positioning accuracy information). The accuracy of the positional information is represented by, for example, using a CEP (Circular Error Probability). If a probability that a GPS receiver is positioned within a particular circle is 50%, the CEP is represented as a radius of the circle. If the GPS receiver is positioned at a location which allows it to receive GPS signals easily (which may be illustrated as outdoors, an indoor window side and the like), the CEP becomes a small value. On the one hand, if the GPS receiver is positioned at a location which does not allow it to receive GPS signals easily, the CEP becomes a large value.

The positional information obtaining unit 112 may obtain the positional information in a predetermined time or may also obtain the positional information at a predetermined time interval. The positional information obtaining unit 112 may also obtain the positional information if a user executes a predetermined operation by using the communication terminal 110. As the predetermined operation, for example, an input/selection operation of information, a power ON/OFF operation, and a start/end operation of calling may be illustrated. The positional information obtaining unit 112 may also obtain the positional information in the background.

The log information generation unit 114 associates each of one or more pieces of positional information obtained by the positional information obtaining unit 112 with clock time information indicating a clock time at which the positional information is obtained to generate one or more pieces of log information. The log information generation unit 114 may also associate terminal identification information for identifying each of one or more communication terminals 110, the positional information, and the clock time information with one another to generate the log information. The log information generation unit 114 may also associate the positional information, the positioning accuracy information, and the clock time information with one another to generate the log information. The log information generation unit 114 may also associate the terminal identification information, the positional information, the positioning accuracy information, and the clock time information with one another to generate the log information. In the present embodiment, the log information generation unit 114 transmits the generated log information to the information collection server 120.

The terminal identification information is not particularly limited as long as it is information which allows for identification of one or more communication terminals 110, respectively. In one embodiment, following items are used as the terminal identification information such as: for example, an MAC address of the communication terminal 110; a BD address (which may be referred to as a BD_ADDR and the like) for identifying a device which supports Bluetooth (registered trademark); an ID specific for a communication terminal such as an address for identifying a device which supports ZigBee (registered trademark); an ID specific for a communication terminal recorded in each type of SIM (Subscriber Identity Module) cards; and an ID specific for a subscriber of a communication terminal assigned to the subscriber (which may be referred to as a subscriber-specific ID, and also, which may be referred to as a terminal manufacturing number, a user ID, an i mode (registered trademark) ID, a subscriber ID, an EZ number, a terminal serial number and the like, depending on a communication carrier).

In another embodiment, as the terminal identification information, information is used which allows the communication terminal 110 to be identified uniquely while suppressing identification of a user. This allows for analysis of the log information considering a temporal relationship between the log information, without identifying a user. For example, a randomly selected code string is provided as the terminal identification information of a particular communication terminal 110. The code string may be a code string specific for each of one or more communication terminals 110, or may also be reused among a plurality of communication terminals 110. The terminal identification information may be updated each predetermined time period, may be updated at a predetermined clock time, or may be updated at an arbitrary timing in response to an instruction from a user and the like.

The communication control unit 116 controls a communication among the communication terminal 110, the communication network 10, and at least one of the information collection server 120 and the population estimation server 130. The communication control unit 116 may be a communication interface. The communication control unit 116 may correspond to a plurality of communication systems.

The information collection server 120 collects each type of information such as the log information. The log information collection unit 122 collects the log information. In one embodiment, the log information collection unit 122 receives one or more pieces of log information from each of one or more communication terminals 110. In another embodiment, the log information collection unit 122 receives one or more pieces of log information from each of one or more base stations or access points of the communication network 10.

The log information storage unit 124 stores the log information collected by the log information collection unit 122. The log information storage unit 124 may also transmit the log information to the population estimation server 130, in response to a request from the population estimation server 130.

The communication control unit 126 controls a communication among the information collection server 120, the communication network 10, and at least one of the communication terminal 110 and the population estimation server 130. The communication control unit 126 may be a communication interface. The communication control unit 126 may correspond to a plurality of communication systems.

The population estimation server 130 estimates a population or a population movement in an arbitrary area. In the present embodiment, the population estimation server 130 estimates a population or a population movement in an arbitrary area by using the log information collected by the information collection server 120. The population estimation server 130 may estimate a total population or may estimate an average population in an arbitrary area.

When a population or a population movement in a particular time period is estimated, a single communication terminal 110 may move within a plurality of areas. In this case, to estimate a total population of a particular area included in the plurality of areas described above, the single communication terminal 110 described above is counted as one communication terminal at least in the particular area described above. In each area included in the plurality of areas described above, the single communication terminal 110 described above may also be counted as one communication terminal.

On the one hand, to estimate an average population of a particular area included in the plurality of areas described above, at least in the particular area described above, a count value on the basis of weight factor considerations is used as a count value of the single communication terminal 110 described above. The count value on the basis of weight factor considerations may be determined based on the number of the plurality of areas described above. The count value on the basis of weight factor considerations may be determined based on the number of the plurality of areas described above, and at least one of a stay time and a moving distance of the communication terminal 110 in each area.

For example, if the communication terminal 110 is present in three areas (for example, an area A, an area B and an area C) in a particular time period, the count value of the communication terminal 110 in each area is counted as ⅓. In another embodiment, for example, if a ratio of the stay times of the communication terminals 110 in the area A, the area B and the area C is 1:2:1, the count values in the area A, the area B and the area C are counted as ¼, ½ and ¼, respectively.

Each of the information collection server 120 and the population estimation server 130 may be achieved, in an information processing apparatus of a general configuration, by activating software or a program which defines operations of each unit of each of the information collection server 120 and the population estimation server 130. The information processing apparatuses used as the information collection server 120 and the population estimation server 130 may include a data processing apparatus having a processor such as a CPU, an ROM, an RAM, a communication interface and the like; an input apparatus such as a keyboard, a touch panel, or a microphone; an output apparatus such as a display apparatus or a speaker, and a storage apparatus such as a memory or an HDD. The data processing apparatus or the storage apparatus may store the software or the program described above. The software or the program described above causes, by being executed by a processor, the information processing apparatus described above to execute operations defined by the software or the program.

Each of the information collection server 120 and the population estimation server 130 may be a virtual server or a cloud system. Each of the information collection server 120 and the population estimation server 130 may be achieved by a single server, or may be achieved by a plurality of servers. Also, the information collection server 120 and the population estimation server 130 may be achieved on the same physical server, or the information collection server 120 and the population estimation server 130 may be the same server.

Figure 2:
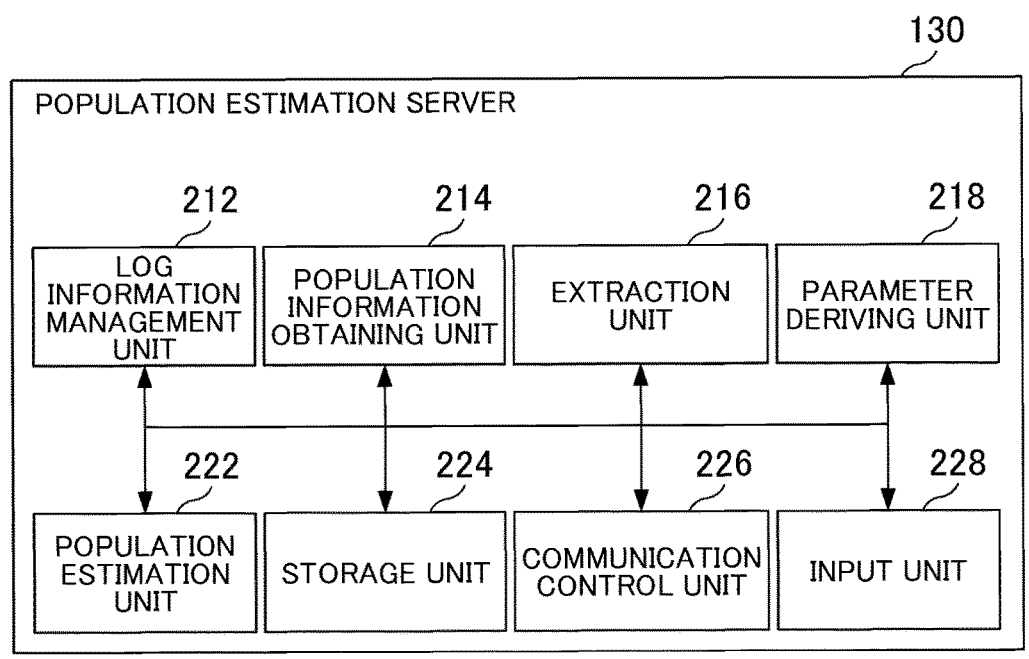
FIG. 2 schematically illustrates one example of a population estimation server 130.

FIG. 2 schematically illustrates one example of a population estimation server 130. In the present embodiment, the population estimation server 130 executes, for example, (i) an interpolation process of the log information, (ii) a deriving process of a relation parameter representing a relation between the number of wireless terminals and a population, and (iii) a population estimation process in an arbitrary area.

For example, the population estimation server 130 executes (i) the interpolation process of the log information to suppress a fluctuation of frequencies or time intervals for obtaining the log information by the communication terminal 110. The population estimation server 130 executes (ii) the deriving process of the relation parameter, by using the log information on which the interpolation process has been performed. More particularly, for each of one or more areas which includes a predetermined geographic range, a relation parameter is derived which represents a relation between the number of wireless terminals and a population, based on the number of wireless terminals present in the area in a particular time (which may be referred to as a reference time). The population estimation server 130 receives information about a time and an area subject to population estimation from a user, and by using the relation parameter described above, executes (iii) the population estimation process in an arbitrary area. This allows a population in an arbitrary area to be estimated with a high accuracy.

In FIG. 2, each unit of the population estimation server 130 is summarized, while details and operations of each unit will be described later. In the present embodiment, the population estimation server 130 includes a log information management unit 212, a population information obtaining unit 214, an extraction unit 216, a parameter deriving unit 218, a population estimation unit 222, a storage unit 224, a communication control unit 226, and an input unit 228. The log information management unit 212 may be one example of at least one of the log information obtaining unit, the classification unit and the interpolation information generation unit. The extraction unit 216 may be one example of at least one of the first terminal extraction unit, the second terminal extraction unit, the local area extraction unit and the relation parameter extraction unit. The parameter deriving unit 218 may be one example of the relation parameter deriving unit. The storage unit 224 may be one example of the relation parameter storage unit.

The log information management unit 212 manages the log information. In the present embodiment, the log information management unit 212 obtains the log information collected by the information collection server 120. The log information management unit 212 stores the obtained log information in the storage unit 224. The log information management unit 212 may analyze a plurality of pieces of log information associated with at least one communication terminal 110 to interpolate the log information. The log information management unit 212 may analyze the obtained log information to generate a movement history of at least one communication terminal 110. The log information management unit 212 may classify, based on the movement history, the communication terminals 110 present in a particular area at a particular clock time into the communication terminals 110 which transited through the area and the communication terminals 110 which stayed in the area.

The log information management unit 212 may generate, based on the movement history, a probability that the communication terminal present in a first area at a first clock time is present in a second area at a second clock time. This allows for determination on which area a communication terminal present in a particular area at a particular clock time likely moves from. Also, this allows for determination on which area a communication terminal present in a particular area at a particular clock time likely moves to in the future.

In one embodiment, the log information management unit 212 may include a presence probability generation unit which generates, based on one or more pieces of movement history information, each of one or more pieces of presence probability information about a probability that a communication terminal present in a first area among one or more areas each of which includes a predetermined geographic range is present in a second area among the one or more areas after each of one or more predetermined time periods is elapsed. The presence probability generation unit may generate one or more pieces of presence probability information for at least one of one or more segments related to times.

In the present embodiment, the population information obtaining unit 214 obtains local population information indicating a population of a local area which includes a predetermined geographic range. Also, the population information obtaining unit 214 obtains wide population information indicating a population of a wide area which includes the local area. The population information obtaining unit 214 may obtain from the input unit 228 the local population information and the wide population information input by a user, or may obtain the local population information and the wide population information stored in an external storage apparatus via the communication control unit 226.

The local area just needs to be a division which includes a predetermined geographic range, and may be illustrated as an administrative division, a division subject to a national census, an area mesh and the like. The local area may also be a particular facility. The wide area just needs to be a geographic region which includes one or more local areas, and may be illustrated as a national territory, an administrative division, a division subject to a national census, an area mesh and the like in each nation. The wide area may be national territories of one or more nations, or may be a region which includes one or more administrative divisions.

Each of the local population information and the wide population information may be information based on a survey result. The information based on the survey result may be illustrated as information indicated by, for example, a national census, a population movement survey, population estimation, statics on the immigration control, an estimation survey on the numbers of tourists and nights to stay, and a tourist area fluctuating survey published by an administrative agency.

The information based on the survey result may also be information indicated by, for example, a traffic survey, an entry/exit record of a particular facility, a visitor record, a guest record, and POS data. The traffic survey may be a survey on a pedestrian traffic, traffic of light vehicles such as bicycles, traffic of vehicles such as motorcycles and automobiles, ship traffic, traffic of aircrafts or space ships, and a combination thereof. The survey may be a survey using a sensor such as an infrared ray sensor, may be a survey using a movie shot by a camera and an image recognition program, or may be a survey using personnel in charge of measurement of traffics and the like.

The local population information may include at least one of constant population information indicating a population which is constantly present in the local area, inflow population information indicating a population which flows in the local area from outside the local area, and outflow population information indicating a population which flows from the local area to outside of the local area. The wide population information may include at least one of constant population information indicating a population which is constantly present in the wide area, inflow population information indicating a population which flows in the wide area from outside the wide area, and outflow population information indicating a population which flows from the wide area to outside of the wide area.

The constant population information is an estimated value or a determined value based on a survey result value of a population which is constantly present in a particular area, for example, in a predetermined time. The inflow population information is an estimated value or a determined value based on a survey result value of a population which flows in a particular area from outside the area, for example, in a predetermined time. The outflow population information is an estimated value or a determined value based on a survey result value of a population which flows from a particular area to outside the area, for example, in a predetermined time.

The extraction unit 216 extracts information which matches an extraction condition, with reference to the storage unit 224. In the present embodiment, the extraction unit 216 receives the extraction request including the extraction condition from the parameter deriving unit 218, the population estimation unit 222 and the like. The extraction unit 216 extracts, when it receives the extraction request, information which matches the extraction condition, with reference to the storage unit 224. The extraction unit 216 outputs the extracted information as a response to the extraction request.

The parameter deriving unit 218 derives a relation parameter which represents a relation between the number of communication terminals 110 and a population. In the present embodiment, the parameter deriving unit 218 derives, for each of one or more local areas, the relation parameter based on the number of communication terminals 110 present in the local area in a reference time and a population of the local area indicated by the local population information. Similarly, the parameter deriving unit 218 may also derive a relation parameter of the wide area.

In one embodiment, the reference time may be any clock time or time period between 8:00 p.m. and 8:00 a.m. The reference time may be any clock time or time period between 9:00 p.m. and 6:00 a.m., may be any clock time or time period between 11:00 p.m. and 4:00 a.m., or may be any clock time or time period between 0:00 a.m. and 3:00 a.m.

The population movement in the nighttime is considered to show a better correlation than the population movement in the daytime with population information published by an administrative agency such as a national census, a population movement survey, and population estimation. Therefore, at any clock time or in any time period between 8:00 p.m. and 8:00 a.m., it is possible to estimate the population with a higher accuracy by deriving a relation parameter of a particular area based on the number of communication terminals 110 present in the area and the population information described above, and using the relation parameter to estimate a population.

In another embodiment, the reference time may also be any clock time or time period within business hours or open hours of a particular facility. In this case, it is possible to estimate the population with a higher accuracy, for example, by using an entry/exit record, a visitor record, a guest record, POS data and the like of a particular facility to derive the relation parameter of the particular facility.

In still another embodiment, the reference time may be any clock time or time period within actual operation hours of a population movement survey such as a traffic survey. In this case, it is possible to estimate the population with a higher accuracy, for example, by using a result of the traffic survey to derive the relation parameter in a target area of the traffic survey.

The parameter deriving unit 218 may also derive a relation parameter of each of one or more local areas for each predetermined time segment. The predetermined time segment may be at least one selected from among one day, one week, one month, three months, six months, one year, weekdays, holidays, and each day of the week, and each time zone. The predetermined time segment may also be the same as an update cycle of the terminal ID. This allows for population estimation with a high accuracy. Also, it can suppress a temporal fluctuation of the estimation result.

For example, if the parameter deriving unit 218 derives the relation parameter once a day, for example, the population on Sep. 1, 2014 is estimated by using the relation parameter on Sep. 1, 2014, and the population on Sep. 2, 2014 is estimated by using the relation parameter on Sep. 2, 2014. Therefore, for example, it is possible to estimate the population with a higher accuracy than to estimate the population by using the same relation parameter through a month or a year. As a result, it can suppress a temporal fluctuation of the estimation result.

The population estimation unit 222 estimates a population of an arbitrary area. The population estimation unit 222 may estimate a total population or may estimate an average population in an arbitrary area. In the present embodiment, the population estimation unit 222 receives input information indicating a geographic range and a time subject to population estimation from the input unit 228. The population estimation unit 222 estimates the population in the geographic range and the time indicated by the input information based on the number of communication terminals 110 in the geographic range and the time indicated by the input information and the relation parameter applied to the geographic range and the time indicated by the input information.

The population estimation unit 222 may estimate a population movement in an arbitrary area in an arbitrary time period. For example, the population estimation unit 222 estimates the population movement in a particular area by calculating a population fluctuation state in the particular area in a particular time period based on an estimated population value of the particular area.

The population estimation unit 222 may estimate a fluctuating population in a particular area based on an estimated population value of the particular area. In one embodiment, the fluctuating population is classified into a retention population and a moving population. The population estimation unit 222 may estimate at least one of the retention population and the moving population in an arbitrary area. In another embodiment, the fluctuating population is classified into a staying population and a transit population. The population estimation unit 222 may estimate at least one of the retention population and the moving population in an arbitrary area.

The storage unit 224 stores each type of information used for information processing in the parameter deriving unit 218, the population estimation unit 222 and the like. The storage unit 224 may also store information generated in the information processing in the parameter deriving unit 218, the population estimation unit 222 and the like.

In the present embodiment, the communication control unit 226 controls a communication among the population estimation server 130, the communication network 10, and at least one of the communication terminal 110 and the information collection server 120. The communication control unit 226 may be a communication interface. The communication control unit 226 may correspond to a plurality of communication systems.

The input unit 228 receives an input from a user. In the present embodiment, the input unit 228 inputs input information indicating a geographic range and a time subject to population estimation. The input unit 228 may be illustrated as a keyboard, a pointing device, a touch panel, a microphone and the like.

Figure 3:
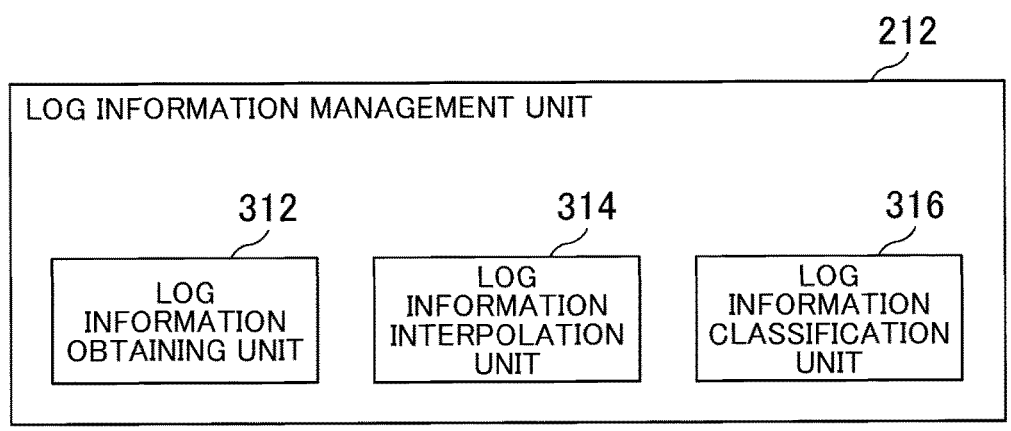
FIG. 3 schematically illustrates one example of a log information management unit 212.

FIG. 3 schematically illustrates one example of a log information management unit 212. In the present embodiment, the log information management unit 212 includes a log information obtaining unit 312, a log information interpolation unit 314, and a terminal classification unit 316. The log information interpolation unit 314 may be one example of the interpolation information generation unit. The terminal classification unit 316 may be one example of the classification unit.

The log information obtaining unit 312 obtains the log information collected by the information collection server 120. The log information obtaining unit 312 stores the obtained log information in the storage unit 224. Note that the log information obtaining unit 312 may also obtain the log information from the communication terminal 110, and a base station or an access point of the communication network 10.

The log information interpolation unit 314 generates information for interpolating the log information. For example, the log information interpolation unit 314 first classifies a plurality of pieces of log information obtained from the information collection server 120 for each communication terminal 110. Also, the log information interpolation unit 314 sorts a plurality of pieces of log information classified for each communication terminal 110, based on the clock time information in the log information. Next, for each of two paired pieces of log information which are temporally continuous, the log information interpolation unit 314 compares the clock time information in the two pieces of log information. If an interval between clock times indicated by the clock time information of two pieces of log information is larger than a predetermined value, the log information interpolation unit 314 generates information for interpolating the two pieces of log information.

An interpolation method of the log information is not particularly limited, but for example, if a distance between positions indicated by positional information of two pieces of log information is smaller than a predetermined value, the log information interpolation unit 314 generates one or more pieces of log information which include the positional information of either of two pieces of log information and clock time information determined such that the log information is obtained at a predetermined time interval. The log information interpolation unit 314 may also generate one or more pieces of log information which include the positional information of either of two pieces of log information and clock time information indicating a predetermined clock time.

On the one hand, if a distance between positions indicated by positional information of two pieces of log information is larger than a predetermined value, the log information interpolation unit 314 generates one or more pieces of log information such that, for example, positions indicated by one or more pieces of log information generated in the interpolation process are arranged at a regular interval on a straight line connecting the positions indicated by the two pieces of log information described above. In this case, the log information interpolation unit 314 may also calculate a moving speed of the communication terminal 110 based on two pieces of log information and generate the clock time information of the log information generated by the interpolation based on the moving speed of the communication terminal 110.

If at least one of the positions indicated by the positional information of two pieces of log information is arranged on a road, on a rail or on a course, the log information interpolation unit 314 may also generate one or more pieces of log information such that the position indicated by the log information generated by the interpolation is arranged on the road, on the rail or on the course. In one embodiment, the log information interpolation unit 314 first generates one or more pieces of log information such that the positions indicated by one or more pieces of log information generated in the interpolation process is arranged at a regular interval on the straight line connecting the positions indicated by the two pieces of log information described above. Next, it corrects each of one or more pieces of generated log information such that the positions indicated by the log information are arranged on the closest road, rail or course.

In another embodiment, the log information interpolation unit 314 first calculates a moving speed of the communication terminal 110 based on positions and times indicated by two pieces of log information. Next, the log information interpolation unit 314 generates one or more pieces of log information such that the positions indicated by one or more pieces of log information generated in the interpolation process are arranged on the road, on the rail or on the course. In this case, the log information interpolation unit 314 may generate the log information such that the positions indicated by the one or more pieces of log information described above are apart from one another at a regular interval. The log information interpolation unit 314 may also generate the log information such that the times indicated by the one or more pieces of log information described above are apart from one another at a regular interval. The log information interpolation unit 314 may also calculate at least one of a moving speed and a moving direction of the communication terminal 110 based on the two pieces of log information described above or on the two pieces of log information described above and the log information before and after them to generate the log information by using at least one of the moving speed and the moving direction.

The terminal classification unit 316 analyzes the log information to classify the communication terminals 110 into the communication terminals 110 which satisfy a particular condition and the communication terminals 110 which do not satisfy the condition.

In one embodiment, the terminal classification unit 316 classifies the communication terminals 110 present in a geographic range indicated by the input information in a time indicated by the input information input by the input unit 228 into the communication terminals 110 which stay in the geographic range indicated by the input information and the communication terminals 110 which transit through the geographic range indicated by the input information, respectively. The communication terminals 110 which stay in the geographic range described above are used, for example, to estimate a staying population in the population estimation unit 222. The communication terminals 110 which transit through the geographic range described above are used, for example, to estimate a transit population in the population estimation unit 222.

Whether a particular communication terminal 110 stays in a geographic range indicated by the input information is determined based on: for example, (a) a ratio of a time for which the particular communication terminal 110 is present in the geographic range indicated by the input information to a time period indicated by the input information; (b) a time length for which the particular communication terminal 110 is present in the geographic range indicated by the input information in the time period indicated by the input information; (c) positions of the communication terminal 110 at a beginning and end of a predetermined time period which includes the clock time indicated by the input information; and (d) a combination thereof. Instead of the time period indicated by the input information described above, the predetermined time period which includes the clock time indicated by the input information may be used.

For example, if the communication terminal 110 present in a geographic range indicated by the input information at a clock time indicated by the input information is present in the geographic range at a clock time when a predetermined time period is elapsed from a clock time indicated by the input information, the terminal classification unit 316 determines that the communication terminal 110 described above stays in the geographic range indicated by the input information. The clock time indicated by the input information may be a beginning of the time indicated by the input information. The clock time at which the predetermined time period is elapsed from the clock time indicated by the input information may also be an end of the time indicated by the input information.

In another embodiment, the terminal classification unit 316 classifies the communication terminals 110 present in a geographic range indicated by the input information in a time indicated by the input information input by the input unit 228 into the communication terminals 110 which remain in the geographic range indicated by the input information and the communication terminals 110 which move within the geographic range indicated by the input information, respectively. The communication terminals 110 which remain in the geographic range described above are used, for example, to estimate a retention population in the population estimation unit 222. The communication terminals 110 which move within the geographic range described above are used, for example, to estimate a moving population in the population estimation unit 222.

Whether the particular communication terminal 110 remains in the geographic range indicated by the input information is determined based on: for example, (a) an average value or the largest value of the moving speed of the communication terminal 110 in the time and the geographic range indicated by the input information; (b) a moving distance of the communication terminal 110 in the time and the geographic range indicated by the input information; (c) an amount of changes in distance between a particular reference position and the terminal in the time indicated by the input information; and (d) a combination thereof. Instead of the time period indicated by the input information described above, the predetermined time period which includes the clock time indicated by the input information may be used.

Figure 4:
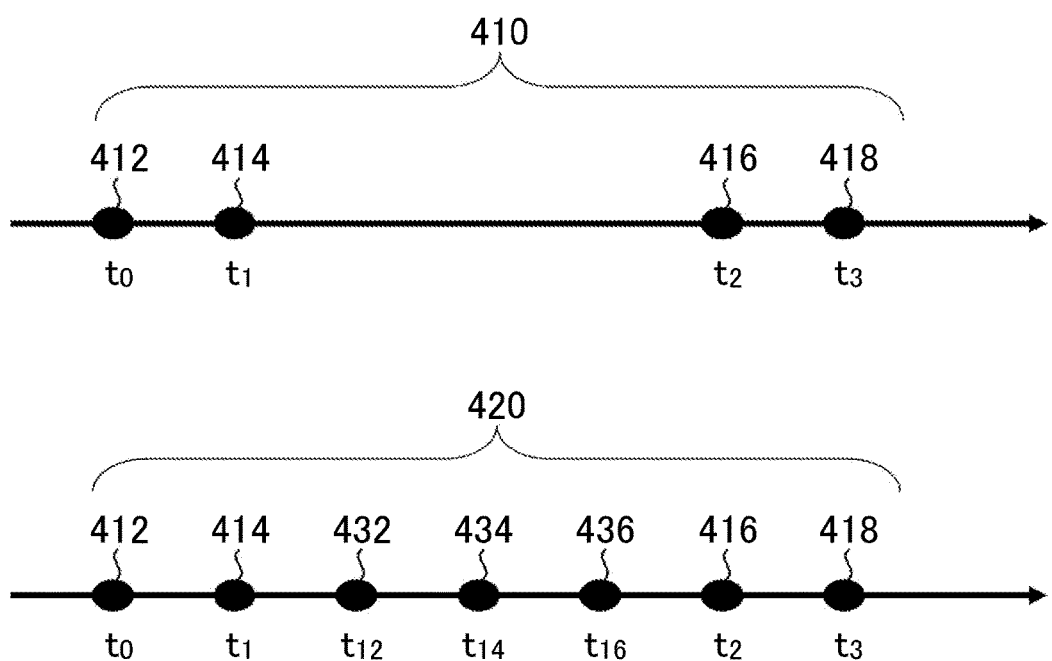
FIG. 4 schematically illustrates one example of an interpolation method of log information.

FIG. 4 schematically illustrates one example of the interpolation method in the log information interpolation unit 314. In the present embodiment, the log information 410 before an interpolation includes log information 412, log information 414, log information 416 and log information 418. For simplicity of the description, one example of the interpolation method is described by using as an exemplary case in which a time between a clock time t0 and a clock time t1 and a time between a clock time t2 and a clock time t3 are five minutes, respectively, and a time between the clock time t1 and the clock time t2 is 20 minutes.

In the present embodiment, the log information interpolation unit 314 first determines, for each of the log information 412 and the log information 414, the log information 414 and the log information 416, and the log information 416 and the log information 418, whether an interval between the clock times of the two pieces of log information is larger than five minutes. In the present embodiment, because the interval between the clock times of the log information 414 and the log information 416 is larger than five minutes, the log information interpolation unit 314 determines to generate one or more pieces of log information for interpolating the log information 414 and the log information 416.

In the present embodiment, the log information interpolation unit 314 generates log information 432, log information 434 and log information 436. Clock time information of the log information 432, the log information 434 and the log information 436 is determined such that, for example, the log information 432, the log information 434 and the log information 436 are arranged at a temporally regular interval. Positional information of the log information 432, the log information 434 and the log information 436 is determined based on positions indicated by the positional information of the log information 414 and the log information 416. The log information interpolation unit 314 stores interpolated log information 420 which includes the log information 432, the log information 434 and the log information 436 in the storage unit 224. This allows a population at an arbitrary clock time to be readily estimated.

Figure 5:
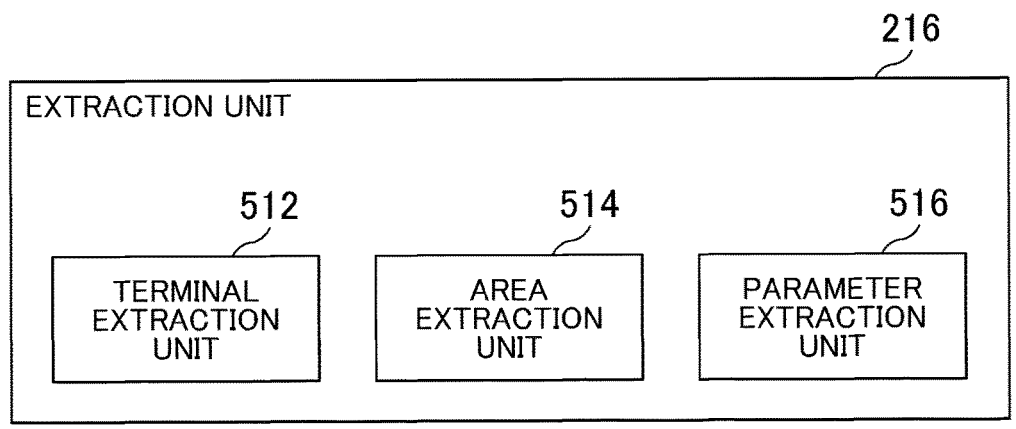
FIG. 5 schematically illustrates one example of an extraction unit 216.

FIG. 5 schematically illustrates one example of an extraction unit 216. In the present embodiment, the extraction unit 216 includes a terminal extraction unit 512, an area extraction unit 514, and a parameter extraction unit 516. The terminal extraction unit 512 may be one example of at least one of the first terminal extraction unit and the second terminal extraction unit. The area extraction unit 514 may be one example of the local area extraction unit. The parameter extraction unit 516 may be one example of the relation parameter extraction unit.

The terminal extraction unit 512 extracts the communication terminal 110 which matches an extraction condition, with reference to the storage unit 224. For example, the terminal extraction unit 512 extracts the identification information of the communication terminal which matches the condition. In one embodiment, the terminal extraction unit 512 receives an extraction request from the parameter deriving unit 218 in a deriving process of the relation parameter in the parameter deriving unit 218, and extracts the communication terminal 110 present in a particular area at a reference time from among one or more communication terminals 110, based on one or more pieces of log information stored in the storage unit 224. In another embodiment, the terminal extraction unit 512 receives the extraction request from the population estimation unit 222 in a population estimation process in the population estimation unit 222, and extracts the communication terminal 110 present in the geographic range indicated by the input information in the time indicated by the input information from among one or more communication terminals 110 based on one or more pieces of log information stored in the storage unit 224.

The area extraction unit 514 extracts the local area or the wide area (the local area and the wide area may be collectively referred to as an area simply) which matches the extraction condition, with reference to the storage unit 224. For example, the area extraction unit 514 extracts the identification information of the area which matches the condition. In one embodiment, the area extraction unit 514 receives the extraction request from the population estimation unit 222 in the population estimation process in the population estimation unit 222, and extracts at least one local area included in the geographic range indicated by the input information from among one or more local areas.

The parameter extraction unit 516 extracts the relation parameter which matches the extraction condition, with reference to the storage unit 224. In one embodiment, the parameter extraction unit 516 receives the extraction request from the population estimation unit 222 in the population estimation process in the population estimation unit 222, and extracts the relation parameter applied to the local area designated by the extraction request. The parameter extraction unit 516 extracts, for example, the relation parameter applied to the local area extracted by the area extraction unit 514 from among one or more relation parameters. In this case, the parameter extraction unit 516 may also extract, in the time indicated by the input information, the relation parameter applied to the local area extracted by the area extraction unit 514.

Figure 6:
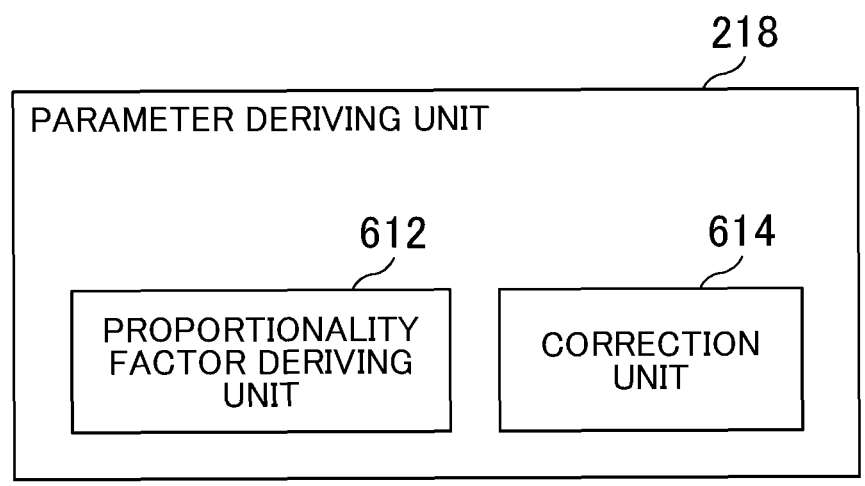
FIG. 6 schematically illustrates one example of a parameter deriving unit 218.

FIG. 6 schematically illustrates one example of a parameter deriving unit 218. In the present embodiment, the parameter deriving unit 218 includes a proportionality factor deriving unit 612 and a correction unit 614.

The proportionality factor deriving unit 612 calculates a proportionality factor for each of one or more local areas, indicating a ratio of the number of communication terminals 110 present in the local area to a constant population of the local area. For example, the proportionality factor deriving unit 612 requests the terminal extraction unit 512 to extract, for each of one or more local areas, the communication terminal 110 present in the local area in a reference time. The proportionality factor deriving unit 612 receives an extraction result from the terminal extraction unit 512. The proportionality factor deriving unit 612 derives the proportionality factor in each of one or more local areas by dividing the constant population information of each of one or more local areas indicated by the local population information obtained by the population information obtaining unit 214 by the number of communication terminals 110 extracted by the terminal extraction unit 512.

In the present embodiment, the proportionality factor derived by the proportionality factor deriving unit 612 is corrected to derive the relation parameter. The correction unit 614 corrects the proportionality factor based on the wide population information to derive the relation parameter. The proportionality factor derived by the proportionality factor deriving unit 612 is one example of the relation parameter. However, by considering the inflow population or the inflow population and the outflow population of each area to derive the relation parameter, the population of each area can be derived with a higher accuracy. For example, if (a) the wide population information is information based on a survey result, and (b) the reference time is not included in operation hours of the survey, or a time period between the reference time and the operation hours of the survey is longer than a predetermined time period, the population of each area can be derived with a higher accuracy by considering the inflow population and the outflow population to derive the relation parameter.

For example, in some local areas, it may be difficult to obtain information indicating the inflow population based on the survey result such as the statics on the immigration control, the estimation survey on the numbers of tourists and nights to stay, and the tourist area fluctuating survey. In such a case, the population of each area can be derived with a higher accuracy by performing a correction process considering the inflow population. Some examples of the correction process are described below. Note that in the example described below, a correction considering the inflow population is described, but a correction considering the inflow population and the outflow population can be performed in the similar procedure.

[First Embodiment of Correction Process]

In one embodiment, the correction unit 614 derives the relation parameter by multiplying the proportionality factors of all of the local areas included in the wide area of which information indicating the inflow population can be obtained by the same correction factor. The correction factor is calculated, for example, by an expression (1) described below.

(Constant population of wide area+Inflow population of wide area)/(Resident population of wide area)  [EXPRESSION (1)]

Note that a value is used as the inflow population of the wide area which is adjusted to a time segment of which the relation parameter is derived. For example, if the inflow population of the wide area obtained by the population information obtaining unit 214 is an inflow population for one year and the time segment of which the relation parameter is derived is one week, the correction factor is calculated by using a value which is the inflow population (persons/year) of the wide area divided by 52 (weeks/year).

[Second Embodiment of Correction Process]

In another embodiment, the correction unit 614 derives the relation parameter by multiplying the proportionality factor of each local area by a correction factor depending on a magnitude of the proportionality factor of the local area. The larger the proportionality factor of the local area is, the larger the correction factor may be determined. The smaller the proportionality factor of the local area is, the larger the correction factor may also be determined.

[Third Embodiment of Correction Process]

In another embodiment, the correction unit 614 derives the relation parameter by multiplying the proportionality factor of each local area by a correction factor depending on a magnitude of the constant population of the local area. The larger the constant population of the local area is, the larger the correction factor may be determined.

[Fourth Embodiment of Correction Process]

In another embodiment, the correction unit 614 derives the relation parameter of a local area of which information indicating the inflow population can be obtained, by multiplying the proportionality factor of the local area by a correction factor of the local area indicated by: (constant population+inflow population)/(resident population). On the one hand, for remaining local areas included in the same wide area as the local area of which the information indicating the inflow population can be obtained, the relation parameter is derived in the manner similar to the first to the third embodiments described above, by setting, as the inflow population of the remaining local areas, a value of the inflow population of the local area of which the information indicating the inflow population can be obtained subtracted from the inflow population of the wide area.

The correction unit 614 may execute the correction process in the fourth embodiment by dividing one local area to a plurality of areas. For example, even if it is difficult to obtain the information indicating the inflow population based on a survey result in a particular local area, the information indicating the inflow population may be obtained based on a survey result in one or more facilities included in the particular local area. Also, if a particular facility in a particular local area opens or closes a business, influences on a population movement of adjacent areas may be simulated. In such a case, the particular local area described above is divided to a region corresponding to the particular facility described above and the remaining regions and the correction process may be executed thereon.

Figure 7:
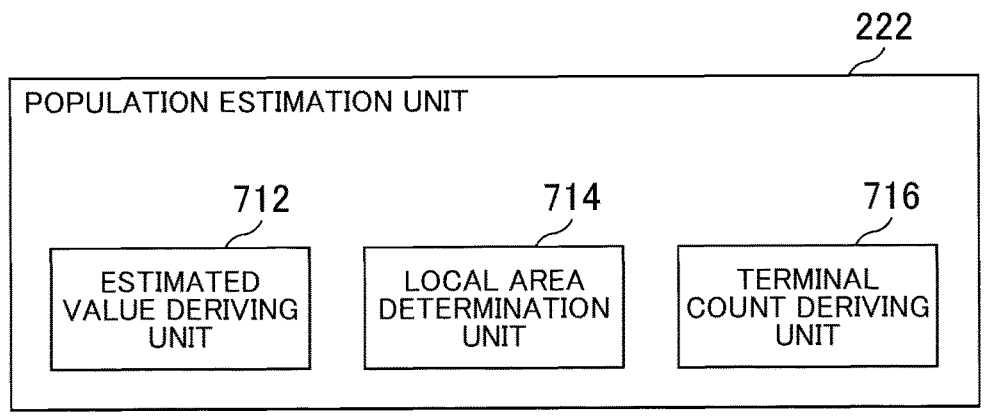
FIG. 7 schematically illustrates one example of a population estimation unit 222.

FIG. 7 schematically illustrates one example of a population estimation unit 222. In the present embodiment, the population estimation unit 222 includes an estimated value deriving unit 712, an area determination unit 714, and a terminal count deriving unit 716. The area determination unit 714 may be one example of the local area determination unit.

The estimated value deriving unit 712 derives an estimated population value from the number of communication terminals 110 by using a relation parameter derived by the parameter deriving unit 218. In the present embodiment, the estimated value deriving unit 712 requests the terminal extraction unit 512 to extract the communication terminals 110 present in a geographic range indicated by the input information in a time indicated by the input information. The estimated value deriving unit 712 receives an extraction result from the terminal extraction unit 512.

The estimated value deriving unit 712 requests the area extraction unit 514 to extract local areas included in the geographic range indicated by the input information. The estimated value deriving unit 712 receives an extraction result from the area extraction unit 514.

The estimated value deriving unit 712 determines the number of communication terminals 110 present in the geographic range indicated by the input information in the time indicated by the input information, based on the extraction result received from the area extraction unit 514. The estimated value deriving unit 712 determines a proper relation parameter depending on the area based on the extraction result received from the area extraction unit 514. The estimated value deriving unit 712 estimates a population of the geographic range indicated by the input information in the time indicated by the input information by multiplying the number of communication terminals 110 present in the geographic range indicated by the input information in the time indicated by the input information by the proper relation parameter depending on the area.

In one embodiment, if the population estimation unit 222 derives an estimated value of a total population, the estimated value deriving unit 712 uses the number of communication terminals 110 extracted by the terminal extraction unit 512 as the number of communication terminals 110 present in the geographic range indicated by the input information in the time indicated by the input information. In another embodiment, if the population estimation unit 222 derives an estimated value of an average population, the estimated value deriving unit 712 may calculate the number of communication terminals 110 present in the geographic range indicated by the input information in the time indicated by the input information, considering a weight factor of each of communication terminals 110 extracted by the terminal extraction unit 512.

The area determination unit 714 determines the local area in which at least one wireless terminal extracted by the terminal extraction unit 512 was present in the most recent reference time, from among one or more local areas based on the log information. The terminal count deriving unit 716 derives the number of communication terminals 110 present in the most recent reference time for each of at least one local area determined by the area determination unit 714.

[First Embodiment of Population Estimation Process]

According to one embodiment of a population estimation process in the population estimation unit 222, the estimated value deriving unit 712 requests the parameter extraction unit 516 to extract a relation parameter applied to the local area extracted by the area extraction unit 514. The estimated value deriving unit 712 may also request the parameter extraction unit 516 to extract, in a time indicated by the input information, a relation parameter applied to the local area extracted by the area extraction unit 514. The estimated value deriving unit 712 receives an extraction result from the parameter extraction unit 516.

According to the present embodiment, the estimated value deriving unit 712 derives an estimated population value of the geographic range indicated by the input information in the time indicated by the input information based on the number of communication terminals 110 extracted by the terminal extraction unit 512 and the relation parameter extracted by the relation parameter extraction unit 516. Particularly, the estimated value deriving unit 712 first calculates, for each of the local areas included in the geographic range indicated by the input information, the estimated population value of each of the local areas by multiplying the number of communication terminals 110 in the local area extracted by the terminal extraction unit 512 by the relation parameter of the local area extracted by the parameter extraction unit 516. Next, the estimated value deriving unit 712 counts up an estimated population value of each local area to derive an estimated population value of the geographic range indicated by the input information in the time indicated by the input information.

The process in the first embodiment is described using an exemplary case in which a population on Sep. 1, 2014, 3:00 p.m. is estimated, provided that the area A, the area B and the area C are included in the geographic range indicated by the input information. Note that in this case, the reference time is 3:00 a.m. and the parameter deriving unit 218 derives the relation parameter once a day. The population estimation process and the deriving process of the relation parameter may be executed in an arbitrary date and time.

First, the parameter deriving unit 218 derives the relation parameter of each area on Sep. 1, 2014 based on the positions at which the communication terminals were present on Sep. 1, 2014, 3:00 a.m. The parameter deriving unit 218 stores the derived relation parameter in the storage unit 224. Next, the area extraction unit 514 extracts the area A, the area B and the area C as areas included in the geographic range indicated by the input information.

Note that the deriving process of the relation parameter in the parameter deriving unit 218 may be executed after the extracting process of the areas by the area extraction unit 514. In this case, the parameter deriving unit 218 may not derive the relation parameters of areas other than the area A, the area B and the area C.

Next, the parameter extraction unit 516 extracts the relation parameter on Oct. 22, 2014, for each of the area A, the area B and the area C, with reference to the storage unit 224. Also, the terminal extraction unit 512 extracts the number of communication terminals 110 present in each of the area A, the area B and the area C on Sep. 1, 2014, 3:00 p.m. with reference to the storage unit 224.

Next, the estimated value deriving unit 712 calculates an estimated population value of each of the area A, the area B and the area C by multiplying "the number of communication terminals 110 present in each area on Sep. 1, 2014, 3:00 p.m." by "the relation parameter of each area on Sep. 1, 2014". Then, the estimated value deriving unit 712 sums up the estimated population value of each area to derive the estimated population value of the geographic range indicated by the input information in the time indicated by the input information.

[Second Embodiment of Population Estimation Process]

According to another embodiment of the population estimation process in the population estimation unit 222, the estimated value deriving unit 712 requests the terminal extraction unit 512 to extract one or more communication terminals 110 present in the local area extracted by the area extraction unit 514. The estimated value deriving unit 712 requests the area determination unit 714 to determine the local area in which each of the communication terminals 110 extracted by the terminal extraction unit 512 was present in the most recent reference time.

The estimated value deriving unit 712 requests the parameter extraction unit 516 to extract the relation parameter applied to each of the local areas determined by the area determination unit 714. The estimated value deriving unit 712 may also request the parameter extraction unit 516 to extract, in a time indicated by the input information, a relation parameter applied to the local area determined by the area determination unit 714. The estimated value deriving unit 712 receives an extraction result from the parameter extraction unit 516.

According to the present embodiment, the estimated value deriving unit 712 first calculates an estimated population value of each local area by multiplying, for each local area determined by the area determination unit 714, the number of communication terminals 110 in the local area derived by the terminal count deriving unit 716 by the relation parameter of the local area extracted by the parameter extraction unit 516. Next, it counts up the estimated population value of each local area described above to derive an estimated population value of the geographic range indicated by the input information in the time indicated by the input information.

The process in the second embodiment is described using an exemplary case in which a population on Sep. 1, 2014, 3:00 p.m. is estimated, provided that the geographic range indicated by the input information is an area X. Note that in this case, the reference time is 3:00 a.m. and the parameter deriving unit 218 derives the relation parameter once a day. The population estimation process and the deriving process of the relation parameter may be executed in an arbitrary date and time.

First, the parameter deriving unit 218 derives the relation parameter of each area on Sep. 1, 2014 based on the positions at which the communication terminals were present on Sep. 1, 2014, 3:00 a.m. The parameter deriving unit 218 stores the derived relation parameter in the storage unit 224.

Next, the area extraction unit 514 extracts the area X as an area included in the geographic range indicated by the input information. Also, the terminal extraction unit 512 extracts the communication terminals 110 present in the area of the area X on Sep. 1, 2014, 3:00 p.m. with reference to the storage unit 224.

Next, the area determination unit 714 determines, for each of the communication terminals 110 extracted by the terminal extraction unit 512, the local area in which the communication terminal was present on Sep. 1, 2014, 3:00 a.m. For example, the area determination unit 714 determines that 50 communication terminals 110 were present in the area of the area X on Sep. 1, 2014, 3:00 p.m. among which 10 communication terminals 110 were present in the area A on Sep. 1, 2014, 3:00 a.m., 25 communication terminals 110 were present in the area B on Sep. 1, 2014, 3:00 a.m., and 15 communication terminals 110 were present in the area C on Sep. 1, 2014, 3:00 a.m.

Note that the deriving process of the relation parameter in the parameter deriving unit 218 may be executed after the determination process of the areas by the area determination unit 714. In this case, the parameter deriving unit 218 may not derive the relation parameters of areas other than the area A, the area B and the area C.

Next, the parameter extraction unit 516 extracts the relation parameter on Oct. 22, 2014, for each of the area A, the area B and the area C, with reference to the storage unit 224. Next, the estimated value deriving unit 712 calculates an estimated value of a population which moves to the area X from the area A, by multiplying "the number of communication terminals 110 present in the area of the area A on Sep. 1, 2014, 3:00 a.m. among the communication terminals 110 present in the area of the area X on Sep. 1, 2014, 3:00 p.m." by "the relation parameter of the area A on Sep. 1, 2014".

The estimated value deriving unit 712 calculates an estimated value of a population which moves to the area X from the area B and an estimated value of a population which moves to the area X from the area C, through the similar procedure. Then, the estimated value deriving unit 712 sums up the estimated value of the population which moves to the area X from each area to derive the estimated value of the population of the geographic range indicated by the input information in the time indicated by the input information.

Using FIG. 8 and FIG. 9, one example of the process in the area determination unit 714 and the terminal count deriving unit 716 in the second embodiment of the population estimation process is described by using an exemplary case for deriving an estimated population value of X city on Sep. 1, 2014, 3:00 p.m. FIG. 8 schematically illustrates one example of a processing result in an area determination unit 714. FIG. 9 schematically illustrates one example of a processing result in a terminal count deriving unit 716.

In the present embodiment, first, the terminal extraction unit 512 extracts the communication terminals 110 present in X city on Sep. 1, 2014, 3:00 p.m., with reference to one or more pieces of log information stored in the storage unit 224. The area determination unit 714 receives terminal IDs of the extracted communication terminals 110 from the terminal extraction unit 512 and inputs them in a row of terminal IDs 812 in a data table 800. Next, the area determination unit 714 determines, for each of the communication terminals 110 extracted by the terminal extraction unit 512, the area in which the communication terminal was present on Sep. 1, 2014, 3:00 a.m., with reference to one or more pieces of log information stored in the storage unit 224. The area determination unit 714 inputs area IDs of the determined areas in a row of area IDs 814 in the data table 800. This allows the data table 800 to be generated which stores the terminal IDs 812 of the terminals present in X city on Sep. 1, 2014, 3:00 p.m., and an area ID 912 of the area in which each terminal was present on Sep. 1, 2014, 3:00 a.m., such that they are associated with one another.

On the one hand, the terminal count deriving unit 716 receives the data table 800 from the area determination unit 714. The terminal count deriving unit 716 counts up the data table 800 to generate a data table 900 which stores the area ID 912 of the area in which each terminal was present on Sep. 1, 2014, 3:00 a.m., and the number of terminal IDs 914 in each area such that they are associated with one another. This allows the estimated value deriving unit 712 to readily calculate an estimated population value of each local area by multiplying the number of terminal IDs 914 by the relation parameter applied to the area indicated by the area ID 912.

Figure 10:
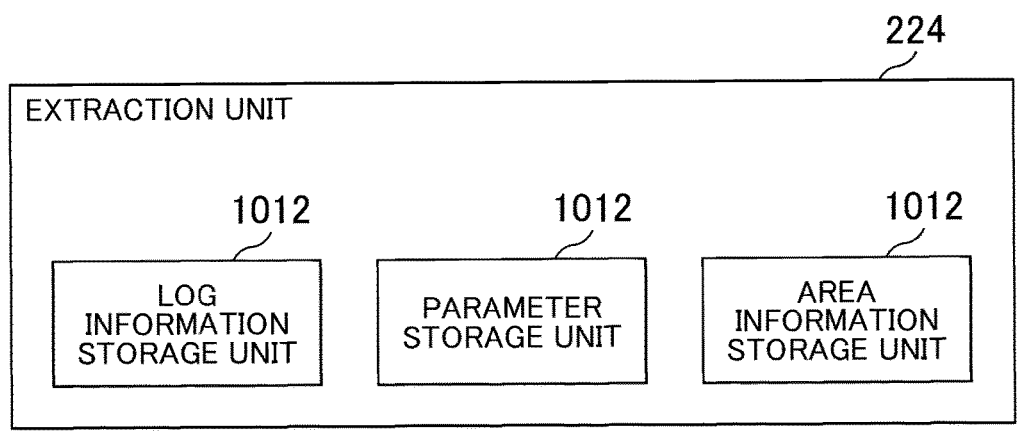
FIG. 10 schematically illustrates one example of a storage unit 224.

FIG. 10 schematically illustrates one example of a storage unit 224. In the present embodiment, the storage unit 224 includes a log information storage unit 1012, a parameter storage unit 1014, an area information storage unit 1016, and a population information storage unit 1018. The log information storage unit 1012 stores the log information obtained by the log information management unit 212. The parameter storage unit 1014 stores the relation parameter derived by the parameter deriving unit 218. The area information storage unit 1016 stores area information about the local area and the wide area. The population information storage unit 1018 stores the population information obtained by the population information obtaining unit 214.

FIG. 11 schematically illustrates one example of a data table 1100. The data table 1100 may be one example of the log information stored in the log information storage unit 1012. In the present embodiment, the data table 1100 stores a terminal ID 1112, positional information 1114 indicating a position of the communication terminal 110 identified by the terminal ID 1112, and clock time information 1116 indicating a clock time at which the positional information 1114 is obtained such that they are associated with one another. The terminal ID 1112 may be one example of the terminal identification information.

FIG. 12 schematically illustrates one example of a data table 1200. The data table 1200 is used to manage the terminal ID if the terminal ID is updated, for example, each predetermined time period. The data table 1200 is stored in the log information storage unit 1012, for example, with the data table 1100. In the present embodiment, the data table 1200 stores a valid time period 1212 of the terminal ID, a terminal ID 1214 in the valid time period, and a terminal ID 1216 for the whole periods such that they are associated with one another. The terminal ID 1216 may be identification information for identifying the terminal ID uniquely throughout a plurality of valid time periods or all valid time periods. This allows for precise population estimation even if the terminal ID 1214 is reused.

FIG. 13 schematically illustrates one example of a data table 1300. The data table 1300 may be one example of parameter information stored in the parameter storage unit 1014. In the present embodiment, the data table 1300 stores each of one or more relation parameters to be associated with at least one of the time segment to which the relation parameter is applied and the geographic range to which the relation parameter is applied. In the present embodiment, the data table 1300 stores a parameter ID 1312 which identifies each of one or more relation parameters, an area ID 1314 of the area to which the relation parameter identified by the parameter ID 1312 is applied, a time segment 1316 to which the relation parameter identified by the parameter ID 1312 is applied, a relation parameter 1322 before the correction process by the correction unit 614, and a relation parameter 1324 after the correction process by the correction unit 614 such that they are associated with one another.

FIG. 14 schematically illustrates one example of a data table 1400. The data table 1400 may be one example of the area information stored in the area information storage unit 1016. In the present embodiment, the data table 1400 stores an area ID 1412 which identifies each of one or more local areas or wide areas and a geographic range 1414 of the area identified by the area ID 1412 such that they are associated with one another.

According to the data table 1400, it can be understood that, for example, the "entire area of Tokyo" indicated by the area ID 1412 of "A0002" is the wide area which includes local areas indicated by the area IDs 1412 of "A0003" and "A0004", and is also the local area included in the "entire area of Japan" indicated by the area ID 1412 of "A0001". This allows, for example, the area extraction unit 514 to extract the local area included in the geographic range indicated by the input information from among one or more local areas with reference to the data table 1400.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in the particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: communication network, 20: information providing server, 100: population estimation system, 110: communication terminal, 112: positional information obtaining unit, 114: log information generation unit, 116: communication control unit, 120: information collection server, 122: log information collection unit, 124: log information storage unit, 126: communication control unit, 130: population estimation server, 212: log information management unit, 214: population information obtaining unit, 216: extraction unit, 218: parameter deriving unit, 222: population estimation unit, 224: storage unit, 226: communication control unit, 228: input unit, 312: log information obtaining unit, 314: log information interpolation unit, 316: terminal classification unit, 410: log information, 412: log information, 414: log information, 416: log information, 418: log information, 420: log information, 432: log information, 434: log information, 436: log information, 512: terminal extraction unit, 514: area extraction unit, 516: parameter extraction unit, 612: proportionality factor deriving unit, 614: correction unit, 712: estimated value deriving unit, 714: area determination unit, 716: terminal count deriving unit, 800: data table, 812: terminal ID, 814: area ID, 900: data table, 912: area ID, 914: the number of terminal IDs, 1012: log information storage unit, 1014: parameter storage unit, 1016: area information storage unit, 1018: population information storage unit, 1100: data table, 1112: terminal ID, 1114: positional information, 1116: clock time information, 1200: data table, 1212: valid time period, 1214: terminal ID, 1216: terminal ID, 1300: data table, 1312: parameter ID, 1314: area ID, 1316: time segment, 1322: relation parameter, 1324: relation parameter, 1400: data table, 1412: area ID, 1414: geographic range

What is claimed is:

1. A population estimation apparatus comprising:
   a log information obtaining unit which obtains log information in which one or more pieces of positional information and clock time information are associated, the one or more pieces of positional information indicating positions of one or more wireless terminals, respectively, and the clock time information indicating clock times at which the one or more pieces of positional information are obtained, respectively;
   a population information obtaining unit which obtains local population information indicating a population of a local area having a predetermined geographic range;
   a first terminal extraction unit which extracts, based on the log information, a wireless terminal present in the local area in a reference time from among the one or more wireless terminals;
   a relation parameter deriving unit which derives a relation parameter representing a relation between the number of wireless terminals and the population based on (i) the population of the local area indicated by the local population information, and (ii) the number of wireless terminals in the reference time extracted by the first terminal extraction unit; and
   an estimated value deriving unit which derives an estimated population value at a clock time or in a time period which is different from the reference time from the number of wireless terminals at the clock time or in the time period which is different from the reference time, by using the relation parameter calculated based on the number of wireless terminals in the reference time, wherein
   the reference time is:
   any clock time or time period between 8:00 p.m. and 8:00 a.m.;
   any clock time or time period within business hours or open hours of a particular facility; or any clock time or time period within actual operation hours of a population movement survey.

2. The population estimation apparatus according to claim 1, wherein the reference time is any clock time or time period between 11:00 p.m. and 4:00 a.m.

3. The population estimation apparatus according to claim 1, wherein
the population information obtaining unit further obtains wide population information indicating a population of a wide area including the local area,
the relation parameter deriving unit includes:
a proportionality factor deriving unit which derives a proportionality factor of the local area by dividing the population of the local area indicated by the local population information by the number of wireless terminals extracted by the first terminal extraction unit; and
a correction unit which corrects the proportionality factor based on the wide population information to derive the relation parameter.

4. The population estimation apparatus according to claim 3, wherein the wide population information includes:
constant population information indicating a population which is constantly present in the wide area; and
inflow population information indicating a population which flows in the wide area from outside the wide area.

5. The population estimation apparatus according to claim 1, further comprising:
a relation parameter storage unit which stores one or more relation parameters such that each of the relation parameters is associated with a geographic range to which the relation parameter is applied;
an input unit which inputs input information indicating a geographic range and a time subject to population estimation;
a second terminal extraction unit which extracts, based on the log information, a wireless terminal present in the geographic range indicated by the input information in a time indicated by the input information from among the one or more wireless terminals;
a local area extraction unit which extracts a local area included in the geographic range indicated by the input information from among one or more local areas; and
a relation parameter extraction unit which extracts, with reference to the relation parameter storage unit, a relation parameter applied to the local area extracted by the local area extraction unit from among the one or more relation parameters.

6. The population estimation apparatus according to claim 5, wherein the estimated value deriving unit derives an estimated population value in the geographic range indicated by the input information in the time indicated by the input information based on the number of wireless terminals extracted by the second terminal extraction unit and the relation parameter extracted by the relation parameter extraction unit.

7. The population estimation apparatus according to claim 5, further comprising a classification unit which classifies, based on the log information, wireless terminals present in the geographic range indicated by the input information in the time indicated by the input information into wireless terminals staying in the geographic range indicated by the input information and wireless terminals transiting through the geographic range indicated by the input information, respectively.

8. The population estimation apparatus according to claim 5, wherein
the relation parameter deriving unit derives the one or more relation parameters for predetermined time segments, respectively,
the relation parameter storage unit stores the one or more relation parameters such that each of the relation parameters is associated with a geographic range to which the relation parameter is applied and the time segment to which the relation parameter is applied, and
the relation parameter extraction unit extracts, with reference to the relation parameter storage unit, a relation parameter applied to the local area extracted by the local area extraction unit in the time indicated by the input information from among the one or more relation parameters.

9. The population estimation apparatus according to claim 8, wherein the predetermined time segment is at least one selected from among one day, one week, one month, three months, six months, one year, weekdays, holidays, and each day of the week, and each time zone.

10. The population estimation apparatus according to claim 5, further comprising:
a local area determination unit which determines, based on the log information, a local area in which the wireless terminal extracted by the second terminal extraction unit is present in the most recent particular time from among the one or more local areas; and
a terminal count deriving unit which derives, for each local area determined by the local area determination unit, the number of wireless terminals present in the most recent particular time, wherein
the relation parameter extraction unit extracts, with reference to the relation parameter storage unit, a relation parameter applied to the local area determined by the local area determination unit from among the one or more relation parameters, and wherein
the estimated value deriving unit:
calculates, for each local area determined by the local area determination unit, an estimated population value of the local area by multiplying the number of wireless terminals in the local area derived by the terminal count deriving unit by the relation parameter of the local area extracted by the relation parameter extraction unit; and
counts up an estimated population value of each local area determined by the local area determination unit to derive an estimated population value of the geographic range indicated by the input information in the time indicated by the input information.

11. The population estimation apparatus according to claim 1, wherein the relation parameter deriving unit derives the relation parameter for each predetermined time segment.

12. The population estimation apparatus according to claim 1, further comprising an interpolation information generation unit which generates information for interpolating two pieces of log information which are temporally continuous among a plurality of pieces of log information associated with at least one of the one or more wireless terminals, if a clock time interval indicated by clock time information included in the two pieces of log information is larger than a predetermined value, wherein
the interpolation information generation unit generates information which interpolates the two pieces of log information such that a position indicated by the information which interpolates the two pieces of log information is arranged on a road, on a rail or on a course.

13. A non-transitory computer-readable recording medium which records a program, wherein the program causes a computer to function as the population estimation apparatus according to claim 1.

14. A population estimation apparatus comprising:
a log information obtaining unit which obtains log information in which terminal identification information, one or more pieces of positional information and clock time information are associated, the terminal identification information identifying each of one or more wireless terminals, the one or more pieces of positional information indicating positions of the one or more wireless terminals, respectively, and the clock time information indicating clock times at which the one or more pieces of positional information are obtained, respectively;
a population information obtaining unit which obtains local population information indicating a population of a local area having a predetermined geographic range;
a first terminal extraction unit which extracts, based on the log information, a wireless terminal present in the local area in a particular time from among the one or more wireless terminals;
a relation parameter deriving unit which derives a relation parameter representing a relation between the number of wireless terminals and the population based on the population of the local area indicated by the local population information and the number of wireless terminals extracted by the first terminal extraction unit; and
an estimated value deriving unit which derives an estimated population value from the number of wireless terminals by using the relation parameter, wherein
the terminal identification information is updated each predetermined time period and reused among a plurality of communication terminals,
the relation parameter deriving unit derives the relation parameter for each predetermined time segment, and
the predetermined time segment is the same as an update cycle of the terminal identification information.

15. The population estimation apparatus according to claim 14, wherein the predetermined time segment is at least one selected from among one day, one week, one month, three months, six months, one year, weekdays, holidays, and each day of the week, and each time zone.

16. The population estimation apparatus according to claim 15, further comprising an interpolation information generation unit which generates information for interpolating two pieces of log information which are temporally continuous among a plurality of pieces of log information associated with at least one of the one or more wireless terminals, if a clock time interval indicated by clock time information included in the two pieces of log information is larger than a predetermined value, wherein
the interpolation information generation unit generates information which interpolates the two pieces of log information such that a position indicated by the information which interpolates the two pieces of log information is arranged on a road, on a rail or on a course.

17. A non-transitory computer-readable recording medium which records a program, wherein the program causes a computer to function as the population estimation apparatus according to claim 14.

18. A population estimation method comprising:
a log information obtaining step of obtaining log information in which one or more pieces of positional information and clock time information are associated, the one or more pieces of positional information indicating positions of one or more wireless terminals, respectively, and the clock time information indicating clock times at which the one or more pieces of positional information are obtained, respectively;
a population information obtaining step of obtaining local population information indicating a population of a local area having a predetermined geographic range;
a first terminal extracting step of extracting, based on the log information, a wireless terminal present in the local area in a reference time from among the one or more wireless terminals;
a relation parameter deriving step of deriving a relation parameter representing a relation between the number of wireless terminals and the population based on (i) the population of the local area indicated by the local population information, and (ii) the number of wireless terminals in the reference time extracted in the first terminal extracting step; and
an estimated value deriving step of deriving an estimated population value at a clock time or in a time period which is different from the reference time from the number of wireless terminals at the clock time or in the time period which is different from the reference time, by using the relation parameter calculated based on the number of wireless terminals in the reference time, wherein
the reference time is:
any clock time or time period between 8:00 p.m. and 8:00 a.m.;
any clock time or time period within business hours or open hours of a particular facility; or
any clock time or time period within actual operation hours of a population movement survey.

* * * * *